(12) United States Patent
Jakobsson et al.

(10) Patent No.: US 9,937,611 B2
(45) Date of Patent: Apr. 10, 2018

(54) DEVICE IN A ROCK DRILLING MACHINE AND ROCK DRILLING MACHINE

(71) Applicant: Atlas Copco Rock Drills AB, Orebro (SE)

(72) Inventors: Erik Jakobsson, Orebro (SE); Thomas Johansson, Orebro (SE)

(73) Assignee: Atlas Copco Rock Drills AB, Orebro (SE)

( * ) Notice: Subject to any disclaimer, the term of this patent is extended or adjusted under 35 U.S.C. 154(b) by 473 days.

(21) Appl. No.: 14/435,209

(22) PCT Filed: Nov. 22, 2013

(86) PCT No.: PCT/SE2013/051376
§ 371 (c)(1),
(2) Date: Apr. 13, 2015

(87) PCT Pub. No.: WO2014/084776
PCT Pub. Date: Jun. 5, 2014

(65) Prior Publication Data
US 2015/0273677 A1  Oct. 1, 2015

(30) Foreign Application Priority Data
Nov. 28, 2012 (SE) ..................... 1251342

(51) Int. Cl.
*B25D 9/20* (2006.01)
*B25D 9/12* (2006.01)
*B25D 9/18* (2006.01)
*F16K 27/04* (2006.01)
*F15B 13/02* (2006.01)

(52) U.S. Cl.
CPC ............... *B25D 9/20* (2013.01); *B25D 9/12* (2013.01); *B25D 9/18* (2013.01); *F15B 13/02* (2013.01); *F16K 27/041* (2013.01)

(58) Field of Classification Search
CPC .... B25D 9/20; B25D 9/12; B25D 9/18; F16K 27/041; F15B 13/02
USPC ......................................................... 173/218
See application file for complete search history.

(56) References Cited

U.S. PATENT DOCUMENTS

| 1,643,560 | A | 9/1927 | Katterjohn |
| 2,034,122 | A | 3/1936 | Terry |
| 2,307,866 | A | 1/1943 | Slater |
| 3,240,158 | A | 3/1966 | Brundage |

(Continued)

FOREIGN PATENT DOCUMENTS

| EP | 0 335 994 | 10/1989 |
| GB | 19424 | 6/1913 |

(Continued)

*Primary Examiner* — Michelle Lopez
(74) *Attorney, Agent, or Firm* — Mark P. Stone

(57) ABSTRACT

A device in a hydraulic rock drilling machine (1) has a distribution valve (7, 7', 7") for controlling hydraulic flow to different parts of the rock drilling machine. The distribution valve has a valve body (8, 8', 8") which moves to and from in an axial direction inside a valve chamber (33). The valve chamber is limited in axial direction by two valve end walls (10, 11; 10', 11'; 10", 11"). One of the valve end walls is movable in an axial direction against an abutment (12, 12") to define an end position for the valve body, and a pressing device (13, 13', 13") is provided for pressing at least one of the valve end walls against the abutment. A rock drilling machine includes the device.

20 Claims, 2 Drawing Sheets

(56) References Cited

U.S. PATENT DOCUMENTS 5,979,291 A    11/1999   Juvonen
6,152,715 A    11/2000   Kaempe et al.

FOREIGN PATENT DOCUMENTS

| | | |
|---|---|---|
| GB | 250677 | 4/1926 |
| GB | 2289092 | 11/1995 |
| WO | WO 2012/138288 | 10/2012 |

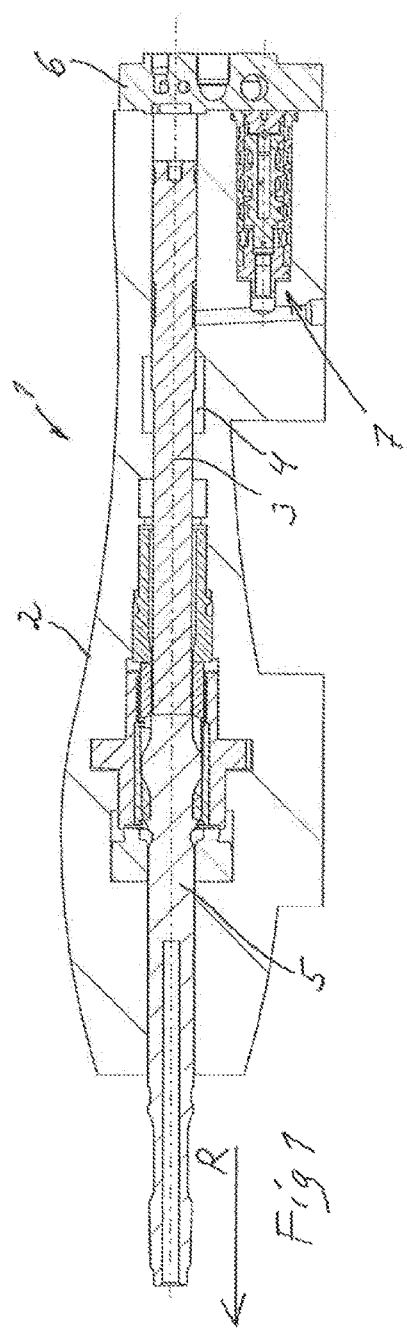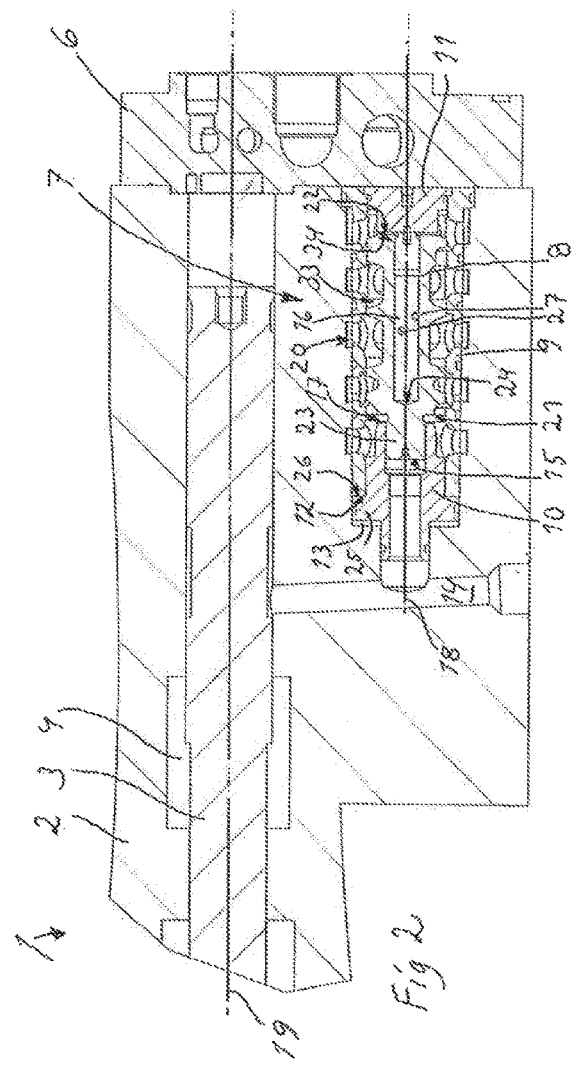

DEVICE IN A ROCK DRILLING MACHINE AND ROCK DRILLING MACHINE

FIELD OF THE INVENTION

The invention relates to a device in respect of a hydraulic rock drilling machine including a distribution valve arranged in connection with the rock drilling machine for controlling hydraulic flows to different parts of the rock drilling machine, wherein the distribution valve includes a valve body, which is arranged movable to and fro in axial directions inside a valve chamber and wherein the valve chamber is limited in axial direction by two valve end walls. The invention also relates to a hydraulic rock drilling machine including such a device.

BACKGROUND OF THE INVENTION

There are previously known hydraulic rock drilling machines that are controlled with the aid of a distribution valve which is arranged in connection with the percussion device. The distribution valve aims to provide intermittent pressurizing of the driving chamber for the impact piston in order to achieve desired percussive function.

Distribution valves so far known function well but require precision machining in order to guarantee reliable valve function, in particular in respect of today's rock drilling machines with increased percussive frequencies. This influences the costs of the valve and thereby of the rock drilling machine as a whole negatively.

As an example of the background art can be mentioned U.S. Pat. No. 2,034,122 A1, which describes a rock drilling machine including a valve with a removable valve end wall.

AIM AND MOST IMPORTANT FEATURES OF THE INVENTION

It is an aim of the present invention to provide a further developed device in respect of hydraulic rock drilling machines according to the above and to suggest an economically produced device in connection with a distribution valve.

This aim is obtained in a device according to the above when at least one of the valve end walls is movable in an axial direction against an abutment in such a way that it defines a fixed end position for the valve body, that a pressing device is arranged for pressing said at least one of the valve end walls in a direction of the second one of said valve end walls and against said abutment, and that said pressing device includes an end wall piston portion arranged on said at least one of the valve end walls and being received in a cylinder portion to be pressurized in order to drive the valve end wall against said abutment during pressurizing.

Hereby is obtained that the valve will become more simple and more economic to produce and to integrate into a rock drilling machine. This is because through the invention it is achieved that the machining operation for producing a defined axial position of a bottom of a bottom hole accurately and with high tolerances can be dispensed with.

Instead, the respective valve end wall is influenced by a pressing device to be normally pressed against said abutment axially in a direction towards the second valve end wall of the distribution valve in order to achieve a fixed end position.

Instead this results in that a defined abutment can be provided which can be made with high precision and to a considerable lower cost than what is the case for creating a defined position of a bottom hole. The abutment can be formed in the valve housing or on a specially provided sleeve or the like being arranged between the two valve end walls.

Said cylinder portion is preferably provided with a connection to a hydraulic pressure source. The hydraulic pressure source is preferably a rock drilling machine system pressure source which economically advantageously results in that a pressure source already existing in the machine can be used. Such a system pressure source can be the source e.g. for any one of percussion pressure, rotation pressure and damping pressure.

It is preferred that the valve chamber in a radial direction is limited by a valve bushing, which is formed with said abutment. This way the position of said abutment(-s) and thereby the end positions of the valve body can be determined and be provided economically with high position.

Because the valve bushing can be produced so as to comprise one unit which includes on the one hand the control edges of the valve chamber co-operating with the valve body, on the one hand said abutment(-s), which in co-operation with the respective valve end wall defines the end position (or end positions) of the valve body, through the invention is ensured in an economic, efficient and secure manner that the elements of the valve chamber determining the control function are accurately positioned relative to each other.

Suitably the valve bushing on a side opposite to the one (or first) of the valve end walls abuts the second one of the valve end walls, which in this embodiment is a fixed valve end wall.

Through this embodiment, wherein the valve bushing is axially displaceable inside a space receiving the valve, and wherein, according to the above, said first valve end wall is pressed against the valve bushing, it is safely achieved that the two end positions of the valve body are accurately positioned in respect of the control edges of the valve bushing.

As a variant, the valve bushing lies against a housing wall whereon abuts also one of the valve end walls, which is also in this case fixed.

As a further variant, a first as well as a second valve end wall can be movable axially against the respective abutment such that when, during pressurizing through a respective pressing device, they lye against these abutments so as to define both end positions of the valve body. This is useful in particular when the valve chamber is not limited by an inserted valve bushing.

In one aspect of the invention an end position regulating device is arranged at at least one of the valve end walls for positioning thereof axially in respect of said abutment for adjusting the end position (end positions) of the valve body. This gives possibility of influencing the operational range, the cross sections of the flow paths of the valve and thereby the operation of the rock drilling machine. Suitably the end position regulating device includes a chamber, which is able to be pressurized with varying pressure acting against any one from the group: a mechanical spring device, a hydraulic/pneumatic spring device, a spring device of synthetic elastic material, a spring device of rubber material.

The invention also relates to a hydraulic rock drilling machine with a machine housing which receives a working cylinder with a to and fro movable impact piston including a device according to the above.

Preferably said device with said distribution valve is received in the machine housing. This gives good possibility of integrating components and thereby cost savings.

It is preferred that the distribution valve has an axis which is parallel to an axis of the working cylinder. This gives the possibility of producing a slim and space-saving rock drilling machine.

It is also preferred that the rock drilling machine has a machine end wall of the working cylinder, wherein said machine end wall also closes a space for receiving the distribution valve. Hereby one single separation plane can be used for the working cylinder as well as the distribution valve, which results in further reduced costs and advantages with respect to sealing.

Further features and advantages of the invention are clarified by the following description of embodiments.

BRIEF DESCRIPTION OF DRAWINGS

The invention will now be described in greater detail by way of embodiments and with reference to the annexed drawings, wherein:

FIG. 1 shows a rock drilling machine including a device according to the invention in an axial section, FIG. 2 shows an enlarged section of a rear end portion of the rock drilling machine in FIG. 1, and FIGS. 3 and 4 show, diagrammatically, two other variants of distribution valves.

DESCRIPTION OF EMBODIMENTS

Figure 3:
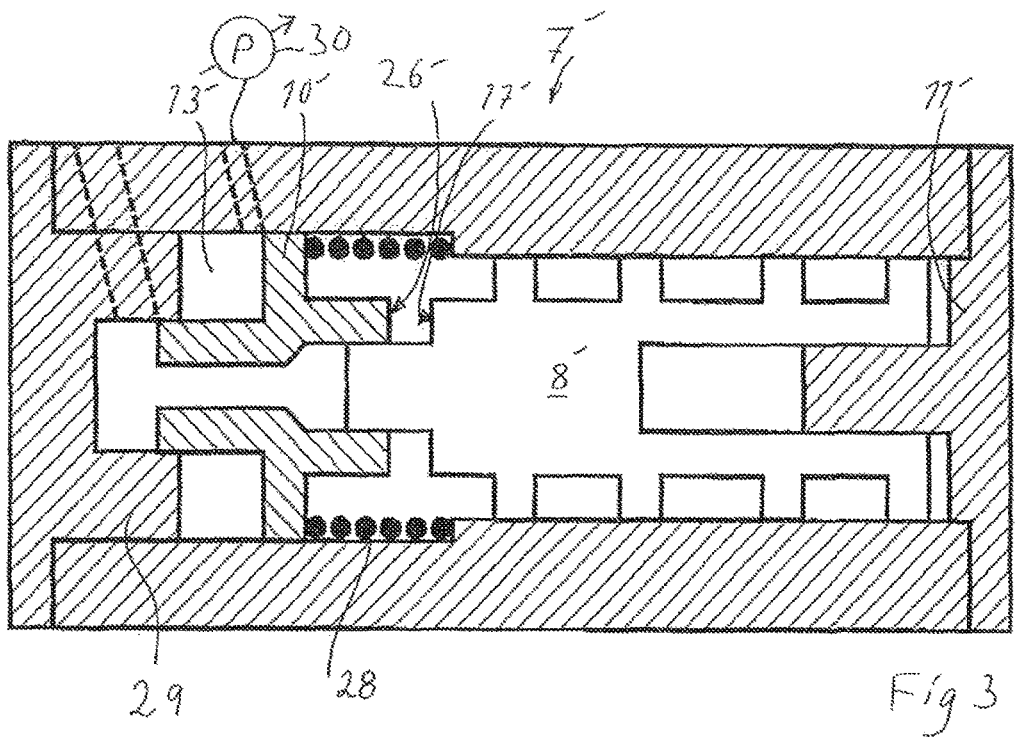

In FIG. 1 is thus shown an axial section of a rock drilling machine 1 including a machine housing 2, wherein an impact piston is axially movable to and fro inside a cylinder space comprising a working cylinder 4. The impact piston 3 performs impacts in an impact direction R against a shank adapter 5 in a per se known manner.

At the rear end region of the rock drilling machine 1 there is arranged a rear housing end wall 6, which closes the cylinder space 4. In the rear end region there is also positioned a distribution valve 7 for distributing pressure fluid to the drive chambers of the rock drilling machine for driving the impact piston 3 to and fro.

In FIG. 2, said rear end region is shown in an enlarged scale, wherefrom can be seen that the distribution valve 7 comprises a to and fro movable valve body 8 which is movable inside a valve bushing 9 between two end positions defined by abutments against a first valve end wall 10 and a second valve end wall 11, respectively. The valve bushing 9 limits a valve chamber 33 receiving the valve body 8 and exhibiting usual bores comprising openings of channels being connected to the distribution valve 7. The valve bushing is arranged to accurately define control edges for co-operation with corresponding control lands of the valve body 8.

The distribution valve 7 is arranged in a valve space 20 inside the housing 2 being closed by said rear housing end wall 6.

The first valve end wall 10 is influenced by pressure in a chamber 13, being permanently pressurized in operation of the rock drilling machine 1, said chamber 13 co-operating with a piston portion 25 on the first valve end wall 10. Because of this pressurization, the first valve end wall 10 is pressed in a direction towards the second valve end wall 11.

The valve end wall 10 exhibits an abutment surface 26 being directed against the second valve end wall 11, whereby said abutment surface 26 will come into abutment against an abutment 12 at the end of the valve bushing 9. Hereby the valve end wall 10 will be accurately positioned relative to the valve end wall 11 during pressurization of the chamber 13.

It should be understood that for correct positioning of the first valve end wall 10 and thereby for obtaining an end position of the valve body 8, there is hereby no longer any need of accurate machining with high tolerances of a bottom hole being formed having a surface directed in the direction of the second valve end wall 11, in what corresponds to the space receiving the distribution valve 7, as is shown in FIG. 2.

Altogether is achieved through the invention that all elements adapted for co-operation with the valve body 8, according to the above, can be effectively accurately positioned in respect of each other, since the valve bushing 9 can be machined in respect of control edges as well as at its (abutment) end(-s) in a relatively simple way.

In the position shown in FIG. 2, the valve body 8 has a first abutment end 21 at a distance from a first end abutment 17 on the first valve end wall 10 of the valve. The valve body 8 is in this position in abutment with a second abutment end 22 against a second end abutment 34 on the second valve end wall 11.

An intermittently pressurized channel 14 is in this shown position pressurized such that a hydraulic pressure actuates an end surface 15 of a central end piston portion 23 of the valve body 8, resulting in that this element takes the position shown in FIG. 2 as is described above.

When the channel 14, because of the movement of the impact piston 3, instead is relieved from pressure (not shown), the valve body 8 will be driven to the left in the Figure, such that the first abutment end 21 of the valve body 8 will come to abutment against the first end abutment 17 on the first valve end wall 10.

This is achieved when a permanent pressurized space 16 inside the valve body 8 receives fluid under pressure transmitted through holes 27 in the wall of the valve body, such that the pressure in this space 16 acts against the end surface 24 of the space 16 for driving the valve body 8 to the left in the Figure.

The invention can also be realized by both the first and the second valve end wall 10, 11 being movable such that both valve end walls can be pressed against abutments in directions towards each other for defining two defined end positions for the valve body 8.

The distribution valve 7 can also be made without a specific valve bushing 9. In that case e.g. an abutment corresponding to the abutment 12 can be arranged otherwise in the valve space 20, for example by an inserted locking sleeve comprising an abutment (corresponding to 12) of the valve end wall 10. Alternatively a bore having an abutment can be machined from the end opposite to the opening of the bore shown in FIG. 2 or in any other per se known way.

In FIG. 2 the distribution valve 7 is shown with its valve axis 18 parallel to the axis of the impact piston 3 and the work cylinder 4, being the axis of the percussion device of the rock drilling machine 1. This embodiment has the advantage that the rock drilling machine can be made slim and space-saving in its rear region. It also allows that said rear housing end wall 6 is common to the working cylinder and the distribution valve such that an otherwise necessary partition plane can be dispensed with. Through the construction with common axes and common rear housing end wall is achieved the advantage of lower machining costs and thereby reduced costs for the rock drilling machine. Further, the risk of moist and debris penetrating into the machine is reduced as well as the risk of failure because of unintentionally released screws.

A further advantage with having a pressurized valve end wall is that the valve body contacting this end wall will experience a softer abutment, since the pressurized valve end wall will be somewhat resilient and somewhat gives away in connection with the impact of the valve body. This reduces strain on the valve and thereby enhances function and increases working live. It is possible, within the scope of the invention, to make it possible to regulate this resilience by for example dimensioning a confined volume and a throttle in the conduit supplying hydraulic medium.

FIG. 3 shows a variant with a distribution valve, wherein a chamber 13' is pressurized with a variable pressure through a variable pressure source 30 against the action of a spring 28. By supplying pressure to this chamber 13', the valve end wall will thus be adjusted such that the higher the pressure the longer the valve end wall 10' will be set in the direction towards the second valve end wall 11'. This gives in certain particular operational cases a possibility to regulate the end position of the valve body and thereby the operation of the rock drilling machine. In this case "abutment" shall be interpreted such that the pressure is so high that the spring reaches the bottom, wherein a "fixed" abutment is obtained. For lower pressures, said adjustability is thus obtained. The channels of the distribution valve are not shown in FIG. 3 for the sake of clarity. Channels for pressurized hydraulic fluid are indicated with interrupted lines.

Figure 4:
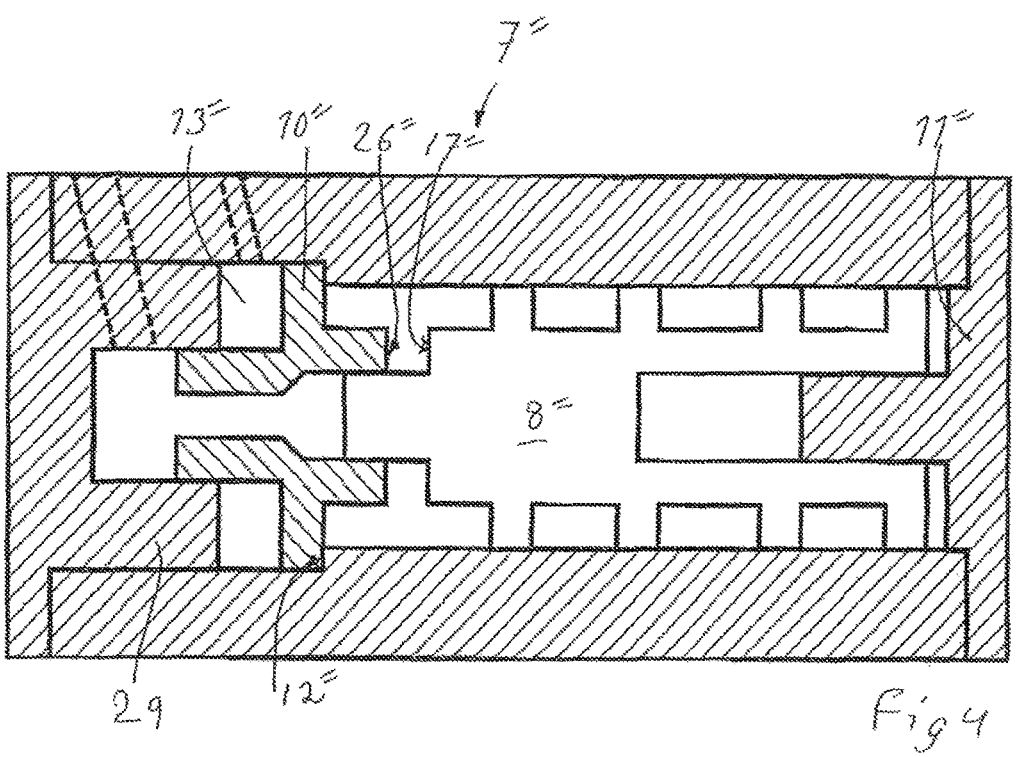

FIG. 4 shows a variant of a distribution valve similar to the one in FIGS. 1 and 2, but in this case (as in FIG. 3) it is intended to illustrate a distribution valve without a valve bushing. "Valve space" is in this case "valve chamber". A chamber 13" is pressurized with a constant pressure. 12" indicates an abutment in the housing, which can be a machine housing of the rock drilling machine or a valve housing. The abutment 12" is suitably produced through boring from the left, which is a direction opposite to the opening of the bore of the space for the distribution valve as seen in all embodiments. A lid for the further bore is indicated with 29.

The invention claimed is:
1. Device in respect of a hydraulic rock drilling machine (1) including a distribution valve (7,7',7") arranged in connection with the rock drilling machine for controlling hydraulic flows to different parts of the rock drilling machine, wherein the distribution valve includes a valve body (8,8',8"), which is arranged movable to and from in axial directions inside a valve chamber (33) and wherein the valve chamber is limited in axial direction by two valve end walls (10,11; 10',11'; 10",11"),
wherein
at least one of the valve end walls is movable in an axial direction against an abutment (12,12") in such a way that it defines a first end position for the valve body,
a pressing device (13,13',13") is arranged for pressing said at least one of the valve end walls in a direction of the second one of said valve end walls and against said abutment, and
said pressing device (13,13',13") includes an end wall piston portion arranged on said at least one of the valve end walls and being received in a cylinder portion to be pressurized in order to drive the valve end wall against said abutment during pressurizing.
2. Device according to claim 1, wherein the cylinder portion includes a connection to a hydraulic pressure source.

3. Hydraulic rock drilling machine (1) with a machine housing (2) which receives a working cylinder (4) with a to and from movable impact piston (3), wherein the rock drilling machine includes a device according to claim 2.
4. Device according to claim 2, wherein the hydraulic pressure source is a system pressure source of the rock drilling machine (1).
5. Hydraulic rock drilling machine (1) with a machine housing (2) which receives a working cylinder (4) with a to and from movable impact piston (3), wherein the rock drilling machine includes a device according to claim 4.
6. Device according to claim 1, wherein the valve chamber (33) in a radial direction is limited by a valve bushing (9), which is formed with said abutment (12).
7. Device according to claim 6, wherein the valve bushing (9) on a side opposite to the one of the valve end walls (10) abuts the second one of the valve end walls (11).
8. Device according to claim 7, wherein the valve bushing (9) lies against a housing wall whereon abuts also one of the valve end walls (11).
9. Device according to claim 6, wherein the valve bushing (9) lies against a housing wall whereon abuts also one of the valve end walls (11).
10. Device according to claim 1, wherein said second one of the valve end walls is movable axially against a second abutment to define a second end position of said valve body so that said two valve end walls are movable axially against said two abutments, respectively, such that when, during pressurizing through a respective pressing device, said two valve end walls lie against said two abutments, respectively, so as to define said first and second end positions, respectively, of the valve body.
11. Device according to claim 1, wherein an end position regulating device is arranged at least at said one of the valve end walls (10) for positioning thereof axially in respect of said abutment for adjusting the first end position of the valve body relative to said abutment.
12. Device according to claim 11, wherein the end position regulating device includes a chamber (13'), which is able to be pressurized with varying pressure (30) acting against any one from the group: a mechanical spring device, a hydraulic/pneumatic spring device, a spring device of synthetic elastic material, a spring device of rubber material.
13. Hydraulic rock drilling machine (1) with a machine housing (2) which receives a working cylinder (4) with a to and from movable impact piston (3), wherein the rock drilling machine includes a device according to claim 1.
14. Hydraulic rock drilling machine according to claim 13, wherein said device with said distribution valve is received in the machine housing.
15. Hydraulic rock drilling machine according to claim 14, wherein the distribution valve has an axis (18), which is parallel to an axis (19) of the working cylinder (4).
16. Hydraulic rock drilling machine according to claim 15, wherein the rock drilling machine has a machine end wall (6) of the working cylinder (4), wherein said machining end wall also closes a space (20) for receiving the distribution valve (20).
17. Hydraulic rock drilling machine according to claim 14, wherein the rock drilling machine has a machine end wall (6) of the working cylinder (4), wherein said machining end wall also closes a space (20) for receiving the distribution valve (20).
18. Hydraulic rock drilling machine according to claim 13, wherein the distribution valve has an axis (18), which is parallel to an axis (19) of the working cylinder (4).

19. Hydraulic rock drilling machine according to claim 18, wherein the rock drilling machine has a machine end wall (6) of the working cylinder (4), wherein said machining end wall also closes a space (20) for receiving the distribution valve (20).

20. Hydraulic rock drilling machine according to claim 13, wherein the rock drilling machine has a machine end wall (6) of the working cylinder (4), wherein said machining end wall also closes a space (20) for receiving the distribution valve (20).

* * * * *